UNITED STATES PATENT OFFICE.

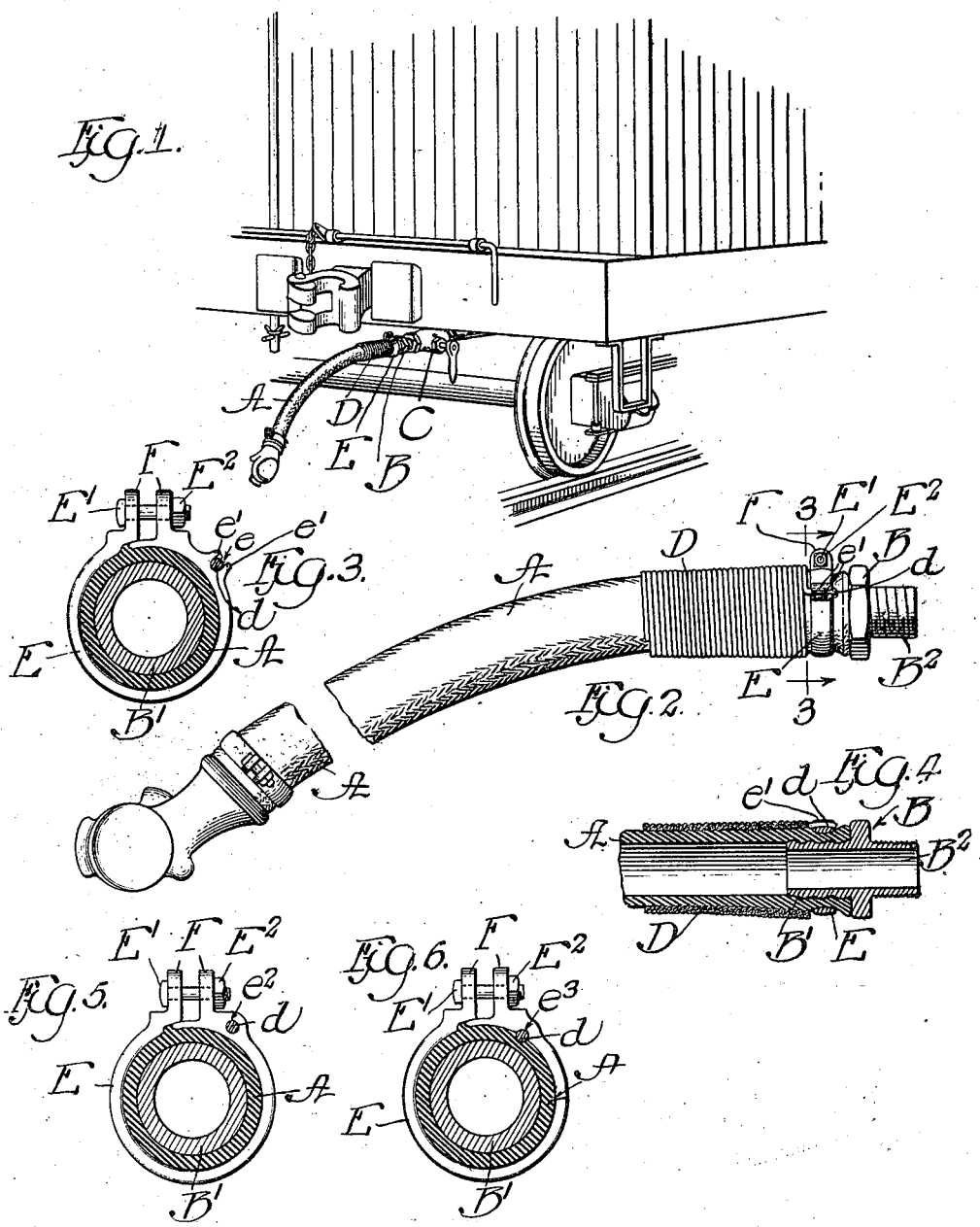

GUILFORD S. WOOD, OF CHICAGO, ILLINOIS.

METAL PROTECTOR FOR HOSE-COUPLINGS.

984,876.

Specification of Letters Patent.

Patented Feb. 21, 1911.

Application filed November 3, 1909. Serial No. 526,150.

*To all whom it may concern:*

Be it known that I, GUILFORD S. WOOD, a citizen of the United States, and a resident of Chicago, in the county of Cook and State of Illinois, have invented certain new and useful Improvements in Metal Protectors for Hose-Couplings; and I do hereby declare that the following is a full, clear, and exact description thereof, reference being had to the accompanying drawings, and to the letters of reference marked thereon, which form a part of this specification.

This invention relates to an improvement in metal protectors for air brake couplings and particularly to the means for securing said metal protectors in position.

The invention consists of the combination of parts hereinafter described and more particularly pointed out in the appended claim.

In the drawings:—Figure 1 shows a portion of an end of a railroad car provided with a hose coupling having my improvement attached. Fig. 2 is a side elevation on an enlarged scale of the hose coupling provided with my improvement. Fig. 3 is a section through Fig. 2 on the line 3—3 thereof. Fig. 4 is a partial longitudinal section through the inner end of the hose coupling. Fig. 5 is a section similar to Fig. 3 showing a slightly modified arrangement. Fig. 6 is another section showing another modified form of the improvement.

A indicates the flexible hose coupling and B, the nipple which is inserted into the hose at one end as indicated at $B^1$ and provided at its other end with a screw-threaded projection $B^2$ by means of which it is attached to the train pipe C in the usual manner. D is the metal protector for the hose, and E, the clamping ring by means of which the hose is clamped on the nipple. Said clamping ring is provided with ears F which are drawn together by means of a bolt $E^1$ and nut $E^2$. These parts are all substantially as described in Letters Patent Number 880,060, granted me on February 25th, 1908.

The metal sheath D, which is in the form of a coil of spring wire, terminates at its inner end in a short piece of straight wire $d$, by means of which the sheath is permanently connected to the hose. In the patent referred to, said attachment is made by clamping the straight projecting piece of wire under the clamping ring E. This method of attachment is objectionable for the reason that the action of the clamping ring tends to embed the straight section of wire into the hose to such an extent as to cut or weaken it at this point so that it soon wears through. The object of this invention is to overcome this objection.

In the construction shown in Figs. 2 and 3, the outer periphery of the clamping ring E is provided with a groove $e$ which is adapted to receive the straight piece of wire $d$. If desired, the points $e^1$ $e^1$ which form the sides of the groove may be swaged over the wire $d$ so as to retain it in position, but usually the natural spring of the wire itself will maintain it in said groove. In the construction shown in Fig. 5 the clamping ring E is provided with a hole $e^2$ through which the straight wire $d$ is inserted. In the construction shown in Fig. 6, the inner surface of the clamping ring is provided with a half round groove $e^3$ which is adapted to receive the end of the wire $d$, the wire in this case lying half in the groove and the other half being embedded in the rubber hose immediately beneath the clamping ring.

It is apparent that in all of the constructions above described the projecting wire $d$ will offer no resistance when the ring E is being clamped on the hose, nor will there be any tendency to so embed the wire into the hose as to cut or unnecessarily wear or weaken it.

I claim as my invention:—

In an air hose coupling, in combination with a hose, a nipple engaged by said hose, a clamping ring adapted to clamp said hose on said nipple, a metal protector for said hose in the form of a coil of spring metal surrounding said hose in the neighborhood of the nipple, an anchoring member projecting longitudinally of said hose from the inner end of said metal protector, and a notch or opening in said ring adapted to receive said anchoring member to retain it in fixed relation to said clamping ring so as to be movable therewith when the ends of the ring are drawn together.

In testimony, that I, claim the foregoing as my invention I affix my signature in the presence of two witnesses, this 30th day of October A. D. 1909.

GUILFORD S. WOOD.

Witnesses:
 GEORGE R. WILKINS,
 T. H. ALFREDS.